United States Patent Office 3,830,799
Patented Aug. 20, 1974

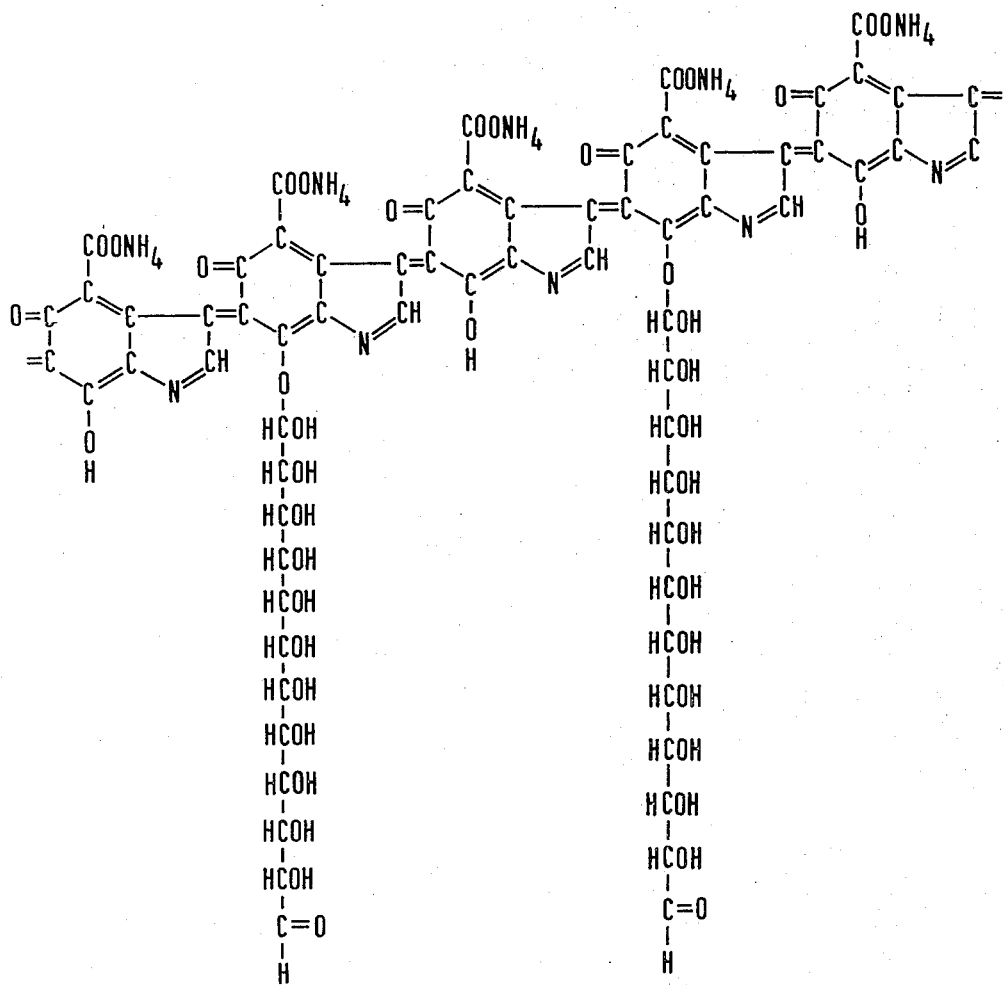

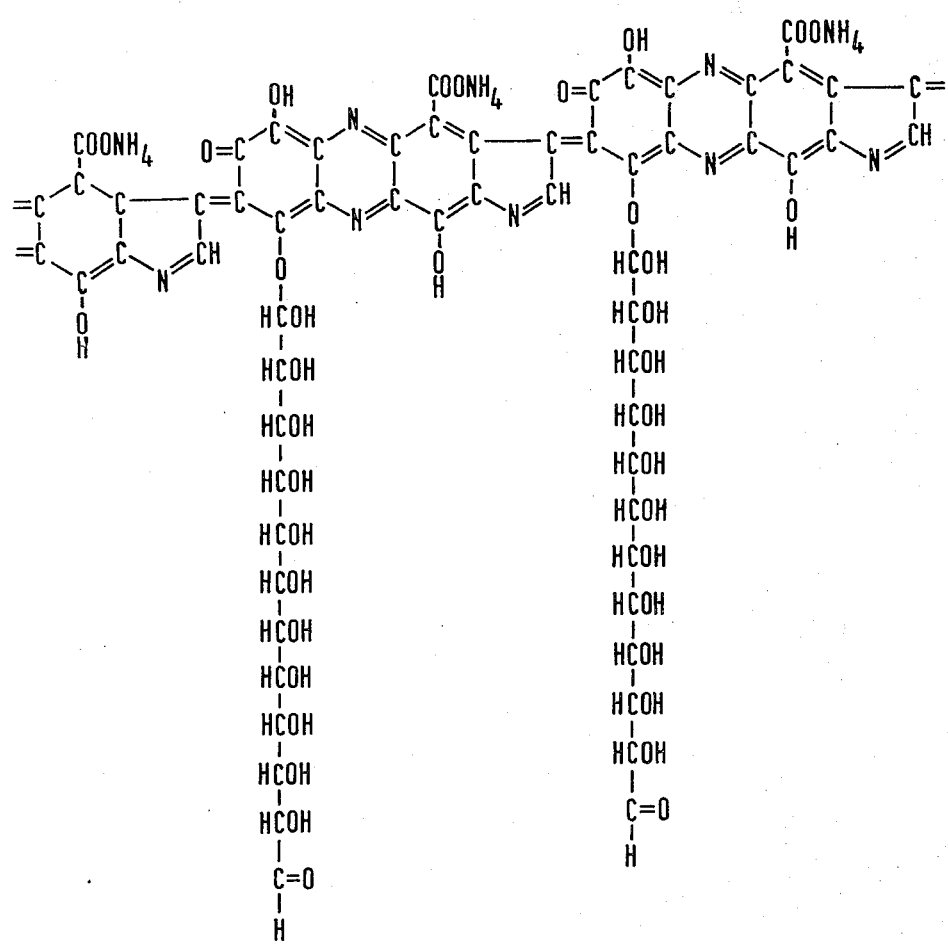
II

3,830,799
METHOD OF PREPARING AN ORGANIC CATION EXCHANGER
Nikolaas Hendrik Siewertsz Van Reesema, Rotterdamseweg 119, Delft, Netherlands
Continuation-in-part of abandoned application Ser. No. 153,035, June 14, 1971. This application Dec. 26, 1972, Ser. No. 318,552
Claims priority, application Netherlands, June 19, 1970, 7009020
Int. Cl. C08b 15/06
U.S. Cl. 260—213                                       2 Claims

ABSTRACT OF THE DISCLOSURE

A humic product, such as ammonium humus crystallate or crystal humus acid is treated with an acid to esterify part of the hydroxyl groups, which are then etherified with the non-esterified hydroxyl groups. The resulting insolubilized humic material is neutralized with cations to produce a cation exchanger.

---

The present application is a continuation-in-part of applicant's copending patent application Ser. No. 153,035, filed June 14, 1971, now abandoned.

This invention relates to the preparation of organic cation exchangers which have such a configuration that they remain insoluble upon reaction with mono- or bivalent cations while retaining their exchanging capacity.

According to the invention, the starting products are humic materials produced by humification of fossil or recent organic matter.

As such I may use the humic material described in Dutch patent specification 38,776. I preferably employ the product described in Dutch patent specification 130,380. For the sake of simplicity, the product described therein, ammonium humus crystallate will hereinafter be termed crystal humus. The corresponding acid will be termed crystal humus acid.

The product called "ammonium humus crystallate" or "crystal humus" as described in Dutch patent 130,380 is prepared by humification of humous or humus producing materials, in particular sphagnum peat, through the action of excess oxygen or air, the pH being adjusted to about 7 by means of ammonia. The resulting product is an ammonium salt of an acid, which produces the corresponding acid upon acidification with any acid whatsoever. This acid, produced by the acidification, is called "crystal humus acid" in the present application.

"Ammonium humus crystallate" or "crystal humus" presumably has the structural formula I (see the accompanying sheet of formulae).

The humic material described in Dutch patent specification No. 38,776 has a slightly different structural formula II (see the accompanying sheet of formulae) with a phenazine-like structure.

Both products contain chains having aliphatic non-cyclically linked hydroxyl groups, and I have found that these hydroxyl groups can be converted into epoxy groups by the action of anhydric acids. First, approximately half the number of these hydroxyl groups are esterified. I have found that if one hydroxyl group is esterified, the two adjacent ones are prevented from being esterified. As a result, every other hydroxyl group is esterified. Upon heating the esterified and the non-esterified hydroxyl groups react to form epoxy groups, releasing the acid.

Some suitable acids for insolubilizing the humic materials are anhydrous phosphoric acid and gaseous hydrogen chloride.

Possible uses of the new insoluble cation exchangers are:

a. in industry (e.g. the sugar industry);
b. in combination with anion exchangers, for example, for the preparation of fresh water from sea water; $Mg^{++}$ is also removed from sea water
c. in combination with anion exchangers, or separately in agriculture and horticulture; in glasshouses in combination with each other for conditioning the soil, especially sandy soils.

EXAMPLE I

Action of phosphoric acid on crystal humus acid 10 g. dry crystal humus as acid is esterified with 5.5 g. 100% phosphoric acid. This quantity is gradually added with continuous vigorous stirring and mixing. The reaction takes place at about 80° C. and the removal of reaction water is promoted by the insufflation of gaseous nitrogen. After esterifying for about 10 minutes, the pH is about 2.

The resulting esterified product is subsequently subjected to etherification to form epoxy groups. The temperature is maintained between 150 and 180° C. Since this reaction is productive of 100% phosphoric acid, which is aggressive, it is neutralized by adding sodium hydrogen carbonate. After etherification for 30 minutes, the last residues of phosphoric acid are washed out until the reaction with barium nitrate is negative.

Granules of the product are deep black when looked upon, although the reflected light differs in colour with different angles of reflection.

When non-insolubilized (ammonium) humus crystallate is dissolved, strong coloration occurs already with minimum quantities. This coloration is caused by the main chain of the crystal humus, which contains a continuous conjugated system.

The pH of sea water is approximately 8. When fresh water is prepared from sea water, the product in the columns is found to be insoluble. This is also the case if the pH is increased, even to 11 and higher. When a 4% NaCl solution was percolated at the pH of sea water, namely 8, a water-clear percolate was formed.

Yield: the starting product was 10 g. crystal humus acid.
There was used 5.5 g. 100% $H_3PO_4$, which in the esterification produces $$5.5 \times \frac{18}{98} = 1.01 \text{ g.}$$

reaction water.

The etherification is productive of 100% $H_3PO_4$ without reaction water.

Therefore, in theory, 10−1.01=8.99 g. should be recovered.

In practice 8.22 percolate was obtained.
Yield 91%.

EXAMPLE II

Reaction of gaseous hydrogen chloride on crystal humus acid

Since gaseous hydrogen chloride is aggressive and could attack the starting material, the lowest possible temperature is used, namely, room temperature and the hydrogen chloride gas is diluted, for example, with nitrogen or a vacuum is used. Furthermore, the stream of gas is preferably added so slowly that the esterification can keep pace with the addition.

100 kg. crystal humus is spread on a perforated round plate in a layer 10 cm. thick. The diameter of the plate is 1.30 m. The layer of crystal humus is intensely agitated. A stream of 1 volume nitrogen mixed with 1 volume gaseous hydrogen chloride is pressed through the layer from the bottom upwardly.

The effluent nitrogen is automatically checked, and may only contain reaction water. The required quantity of HCl gas in non-diluted condition is about 0.63 m.³ for the esterification of half the hydroxyl groups.

When this quantity has been absorbed, the esterified solid product is discharged at the bottom and rapidly heated at a temperature of about 150° C. in an etherifying drum. HCl is then released. This must be rapidly discharged by a vigorous nitrogen stream, for example, in about 30 minutes, so that only relatively small quantities of HCl are present during the etherification.

The nitrogen from the etherification drum is mixed in the gas container with the nitrogen from the esterification drum, and used with a fresh batch of crystal humus acid.

EXAMPLE IIA

Use as cation exchanger

The exchanging capacity of the product of Example II is found from an analysis by percolation under neutral conditions. The exchanging capacity per gram of exchanger by percolation was 161 mg.

EXAMPLE IIB

In a suction crucible, the rate of exchange of a cation exchanger comprising 6.65 g. insolubilized crystal humus acid, and laden with NH₄Cl solution was measured.

16.6 cc. 4% NaCl solution containing $$\frac{16.6 \times 4}{100} \text{ g. NaCl} = 0.664 \text{ g.}$$

NaCl, was percolated in five minutes. 0.0664 g. NaCl was found in the percolate, so that 90% had been exchanged in five minutes.

I claim:

1. A process for preparing an organic cation exchanger, which comprises reacting a humic product having aliphatic non-cyclically linked hydroxyl groups with an anhydric acid selected from anhydrous phosphoric acid and gaseous hydrogen chloride to esterify approximately half of the hydroxyl groups contained in said humic product and etherifying the esterified hydroxyl groups with the non-esterified hydroxyl groups with release of the acid used to form an insolubilized humic material, and neutralizing said insolubilized humic material with cations having a valency not exceeding 2.

2. A process according to claim 1, wherein the starting product is ammonium humus crystallate.

References Cited

UNITED STATES PATENTS

| | | | |
|---|---|---|---|
| 3,307,934 | 3/1967 | Palmer et al. | 71—24 |
| 3,674,649 | 7/1972 | Formisano et al. | 71—24 |

DONALD E. CZAJA, Primary Examiner

R. W. GRIFFIN, Assistant Examiner

U.S. Cl. X.R.

71—24; 210—500, 510